United States Patent
Abrams et al.

[11] Patent Number: 6,050,299
[45] Date of Patent: Apr. 18, 2000

[54] HIGH PRESSURE AIR SEQUENCER

[75] Inventors: Jared Abrams, Merrick; John Baumann, Islip, both of N.Y.

[73] Assignee: Uniwave, Inc., Farmingdale, N.Y.

[21] Appl. No.: 09/203,983

[22] Filed: Dec. 2, 1998

[51] Int. Cl.[7] .................................. F16K 31/72
[52] U.S. Cl. .................. 137/624.13; 137/625.11
[58] Field of Search ................ 737/625.11, 624.13

[56] References Cited

U.S. PATENT DOCUMENTS

| | | | |
|---|---|---|---|
| 1,272,943 | 7/1918 | Gordon | 137/625.11 |
| 3,073,289 | 1/1963 | Candelise | 137/625.11 |
| 3,133,723 | 5/1964 | Goldman et al. | 251/309 |
| 3,773,078 | 11/1973 | Suntheimer | 137/625.11 |
| 3,972,350 | 8/1976 | Pickett | 137/625.11 X |
| 3,995,494 | 12/1976 | Muller et al. | 137/625.11 X |
| 4,193,580 | 3/1980 | Norris et al. | 251/309 |
| 4,210,169 | 7/1980 | Palma | 137/624.13 X |
| 4,305,417 | 12/1981 | Bell, Jr. | 137/625.11 X |
| 4,989,641 | 2/1991 | Jones et al. | 137/652.11 |
| 5,887,569 | 3/1999 | Romanelli et al. | 137/625.11 X |

*Primary Examiner*—Stephen M. Hepperle
*Assistant Examiner*—John Bastianelli
*Attorney, Agent, or Firm*—Schweitzer Cornman Gross & Bondell LLP

[57] ABSTRACT

A high working pressure air sequencer has a manifold to which are connected a high pressure air inlet and a plurality of outlets to which high pressure air is to be distributed. A rotary valve head is located within the manifold, and sequentially couples the air inlet to a different outlet. The valve head includes an outlet button which includes a bore which sequentially aligns with the outlet bores. Both the outlet button bore and the outlet bore portions with which the button bore aligns are of geometries which provide a rapid transition between coupled and uncoupled air passage conditions.

1 Claim, 4 Drawing Sheets

HIGH PRESSURE AIR SEQUENCER

The present invention relates to a new and improved high working pressure air sequencer of the type used in connection with textile machines and the like.

BACKGROUND OF THE INVENTION

Textile equipment, and particularly knitting machines and the like, utilize compressed air for numerous functions. One of such functions is the cleaning of particular portions of the knitting machine with a high pressure air blast. To conserve energy requirements, means are typically provided to channel or sequence the air among a plurality of locations. It has heretofore been difficult, however, to accurately and precisely control the timing and sequence of the distribution of air. In particular, the maintenance of a constant air flow through a particular port for a controlled length of time has been difficult to achieve. Electrically-operated solenoid valves have often been used to control the air flow, as they may be precisely timed and operated with electrical impulses. Such valves, however, are both costly and of large size.

It is accordingly the purpose of the present invention to provide a high pressure air sequencer which has improved switching characteristics, which is of compact size, and does not require solenoid-operated valves.

BRIEF DESCRIPTION OF THE INVENTION

In accordance with the foregoing, a high pressure air sequencer constructed in accordance with the present invention has an inlet port coupled to a source of high pressure air and a plurality of outlet ports through which a sequenced high pressure air flow may be distributed to the desired locations. Both the inlet port and the outlet ports are coupled to a manifold in which a rotating distributor valve head is located. The distributor valve head is driven by a motor and sequentially couples the inlet port to the outlet ports. The valve head includes an outlet button. The outlet button has an opening of elongated shape, which sequentially aligns with a different outlet port as the distributor head rotates. The size of the button opening is substantially smaller than the size of the outlet port openings with which it aligns, each of which have a similar elongated shape, whereby the outlet port opening is fully exposed and coupled to the inlet flow for a substantial portion of the time in which the button opening is aligned with the outlet port opening, and a rapid change of state between closed and substantially full open states occurs.

BRIEF DESCRIPTION OF THE DRAWINGS

A fuller understanding of the present invention will be obtained upon review of the following detailed description of a preferred, but nonetheless illustrative embodiment of the invention, when considered in conjunction with the annexed drawings, wherein.

DETAILED DESCRIPTION OF THE INVENTION

Figure 1:
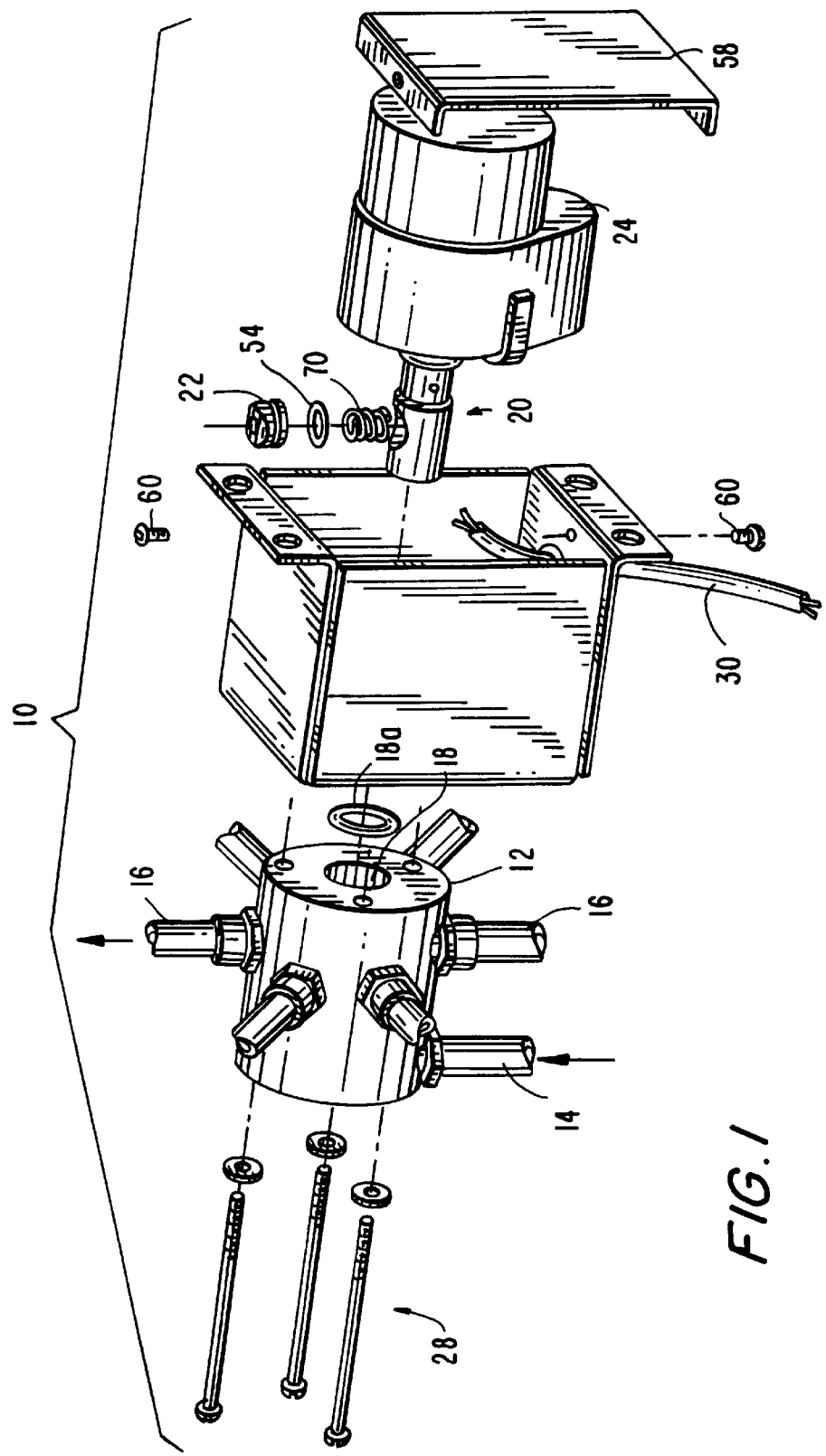
FIG. 1 is an exploded perspective view of the present invention.

With initial reference to FIG. 1, high pressure sequencer 10 comprises manifold 12 which couples high pressure air inlet 14 in a continuing sequential manner to air outlets 16. The manifold 12 includes a generally cylindrical central chamber 18 in which distributor valve head 20 is located. The distributor valve head 20 includes an outlet button 22 which is maintained in contact with the wall of the central chamber 18 by spring 70. Distributor valve head 20 rotates about a central axis 18a of the central chamber 18 by the action of gear motor 24. As the distributor valve head 20 rotates, outlet button 22 sequentially couples the inlet 14 to one of the outlets 16, creating a pressurized air passageway therebetween. Gear motor 24 may be mounted within a housing 26, manifold 12 being fastened to the bottom exterior surface of the housing 26 and to motor 24 by bolts 28. Power cord 30 connects the gear motor 24 to an appropriate source of electrical power. Housing cover 58 is removably mounted to the housing by screws 60.

Figure 2:
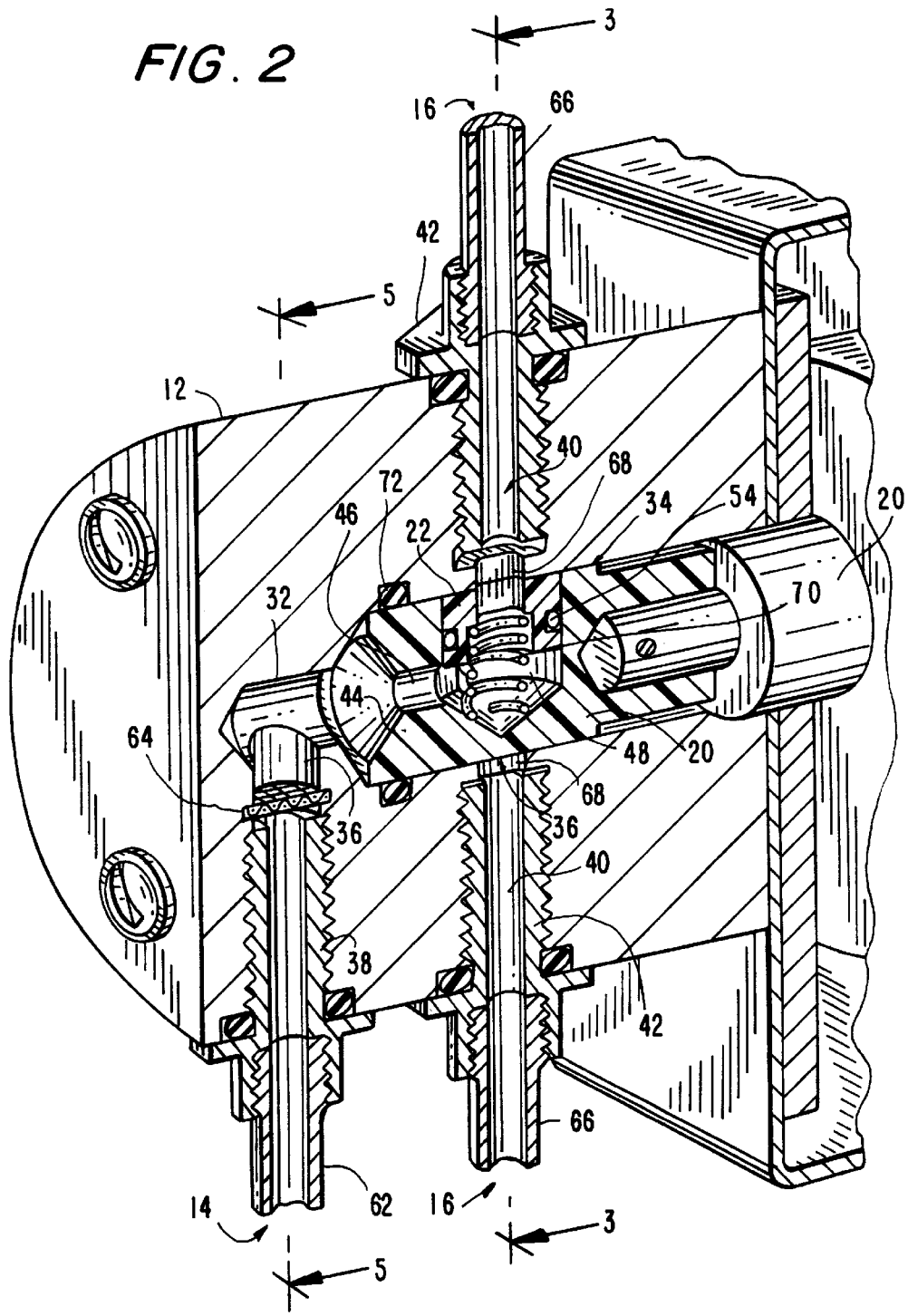
FIG. 2 is a perspective view in section of the distributor portion thereof.
Figure 3:
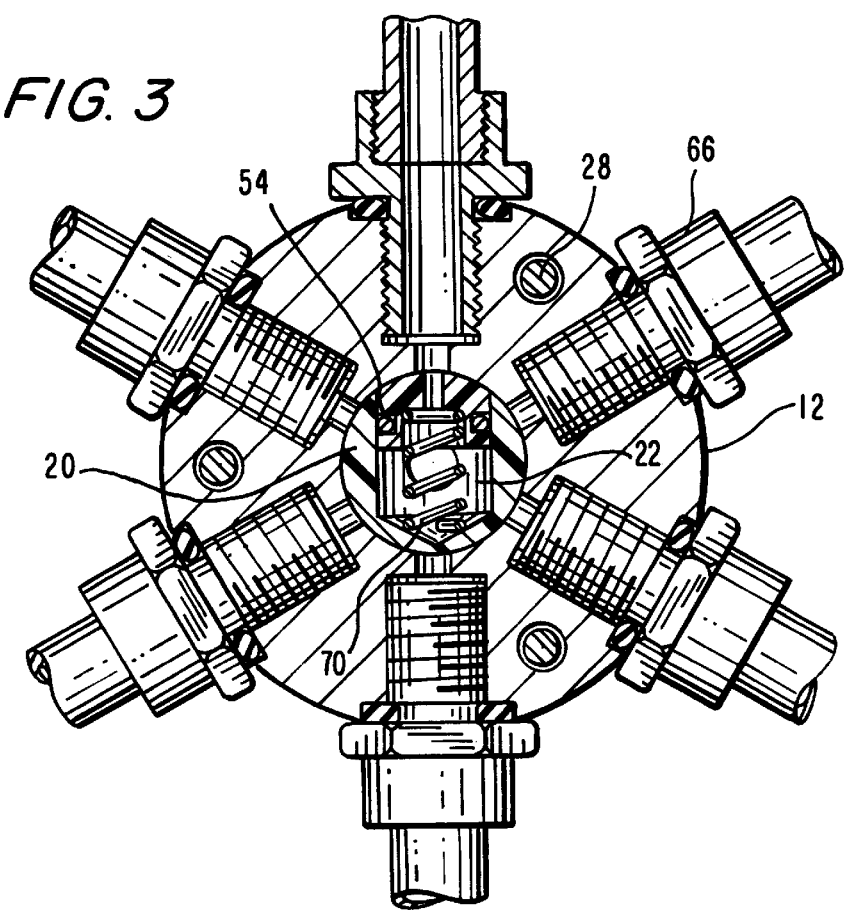
FIG. 3 is a section view taken along line 3—3 of FIG. 2.
Figure 5:
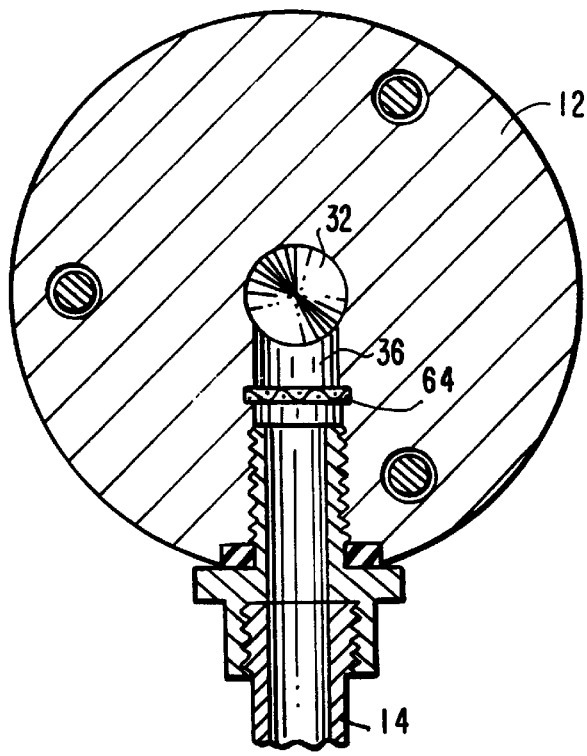
FIG. 5 is a section view taken along line 5—5 of FIG. 2.

With further reference to FIGS. 2, 3 and 5, central chamber 18 in manifold 12 may be of a stepped construction with distal portion 32, which is in communication with inlet 14, being of a lesser diameter than the main portion 34 which is in communication with outlets 16. As shown, chamber end portion 32 is joined to lateral bore 36 into which connector 38 may be mounted to provide a threaded connection for an inlet fitting 62. A filter screen 64 may be mounted in the lateral bore to prevent foreign particles from passing into the manifold. Similarly, main chamber portion 34 is provided with lateral bores 40, into which connectors 42 are mounted, providing a means of connection with outlet fittings 66.

Figure 4:
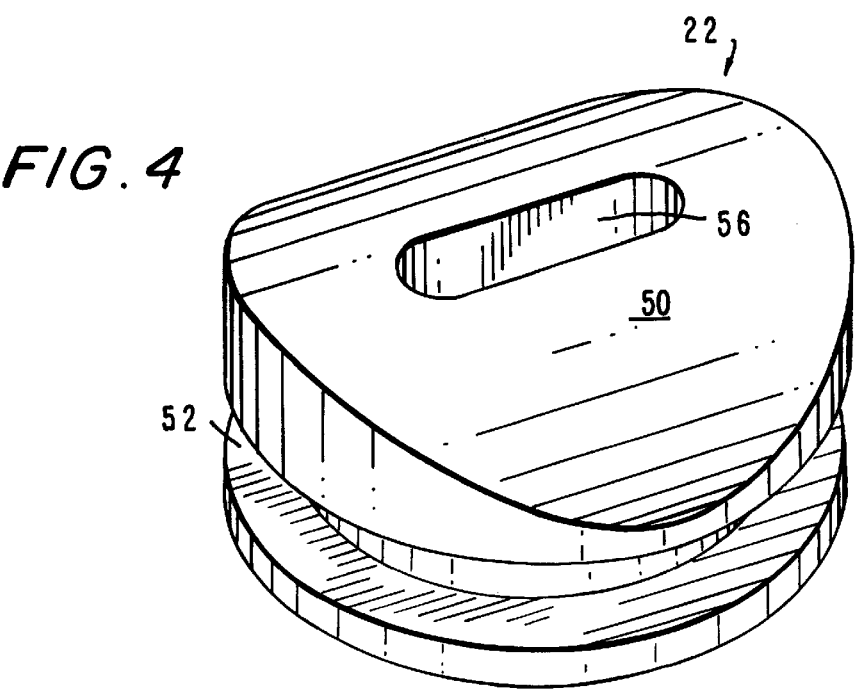
FIG. 4 is an enlarged view of the distributor head.

Distributor valve head 20, installed within the main portion 34 of chamber 18, includes an inwardly-directed conical recess 44 having a passageway 46 extending inwardly therefrom coupled to transverse bore 48. An O-ring fitting 72 is located in an accepting groove in the manifold proximate the distal end of the distributor head 20, and creates an air-tight seal therebetween with respect to the pressurized air entering through lateral bore 36. Mounted within transverse circular bore 48 is the outlet button 22, best seen in FIG. 4. Outlet button 22 has a curved exterior face 50 whose radius of curvature conforms to that of the inner surface of main chamber portion 34, whereby a smooth sealing connecting is obtained therebetween. Throughbore 56, of elongated shape, extends from the front face 50 through the button. Outlet button 22 also has a peripheral groove 52 into which O-ring 54 (FIG. 2) is installed. O-ring 54 provides an air-tight connection between the valve button 22 and distributor valve head 20. Spring 70 urges the valve button outwardly into contact with the side wall of chamber portion 34.

Figure 6A:
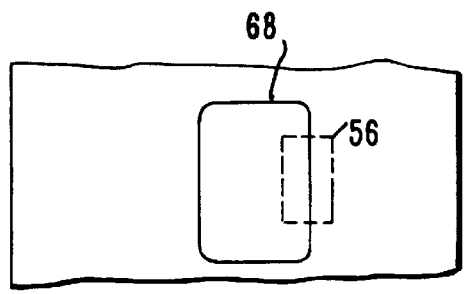
FIGS. 6A–C are sequential views of the relationship between the button opening and an aligned outlet port opening.
Figure 6B:
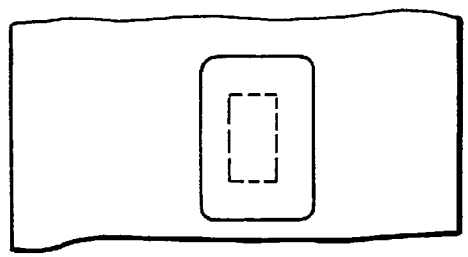
Figure 6C:
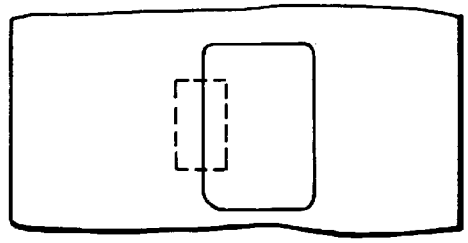

Each of the lateral outlet bores 80 has a portion 68 adjoining chamber portion 34 of a similar, elongated construction to that of bore 56 in button 22, with greater dimensions. As depicted in FIGS. 6A–C, each of the bore portions 68 is of such an elongated construction with its height, parallel to the length of chamber portion 34, being greater than its width. As valve head 20 carrying outlet button 22 rotates, outlet button throughbore 56 comes into alignment with an outlet bore portion 68, allowing air flow to be established through the distributor valve head and into the outlet bore, the greater cross-sectional area of the bore portions 68 allowing full overlap with the throughbore portion 56 a substantial portion of the total transit time for of throughbore 56 across bore portion 68. In addition, because of the vertically elongated shape of the bores, as alignment commences and terminates, as depicted in FIGS. 6A and C, respectively, substantial surface area of the bores are in rapid transition between overlapping and non-overlapping orientations, providing a pulse effect for start and end switching points for the pressurized air which is of benefit in lint removal from the machine surfaces to which the outlets are directed.

In a preferred embodiment in which the distributor head rotates at a speed of one revolution per minute, throughbore 56 of contact button 22 may have dimensions of 0.06 inches by 0.210 inches, while the larger bore portions 68 in the side wall of the central chamber may have corresponding dimensions of 0.210 inches by 0.226 inches. The diameter of the central chamber is 0.565 inches. Such dimensions allow six output ports to be located about the periphery of the manifold and maintain sufficient sequencing time for each outlet. Other size combinations and numbers of outlets may be utilized as appropriate.

We claim:

1. An air sequencer, comprising:

a manifold having a central chamber and an air inlet bore and a plurality of air outlet bores extending from the central chamber; and a rotating valve head located in said central chamber, said valve head having a passageway therethrough for coupling said air inlet bore sequentially in an air-tight manner to one of said air outlet bores as the valve head rotates, said valve head having an outlet button with a bore therethrough positioned for sequential alignent with the outlet bores, said outlet button bore and said outlet bores being of elongated cross-section with an elongated axis parallel to an axis of rotation for the valve head, the cross-sectional area of the button bore being smaller than that of the outlet bores.

* * * * *